UNITED STATES PATENT OFFICE.

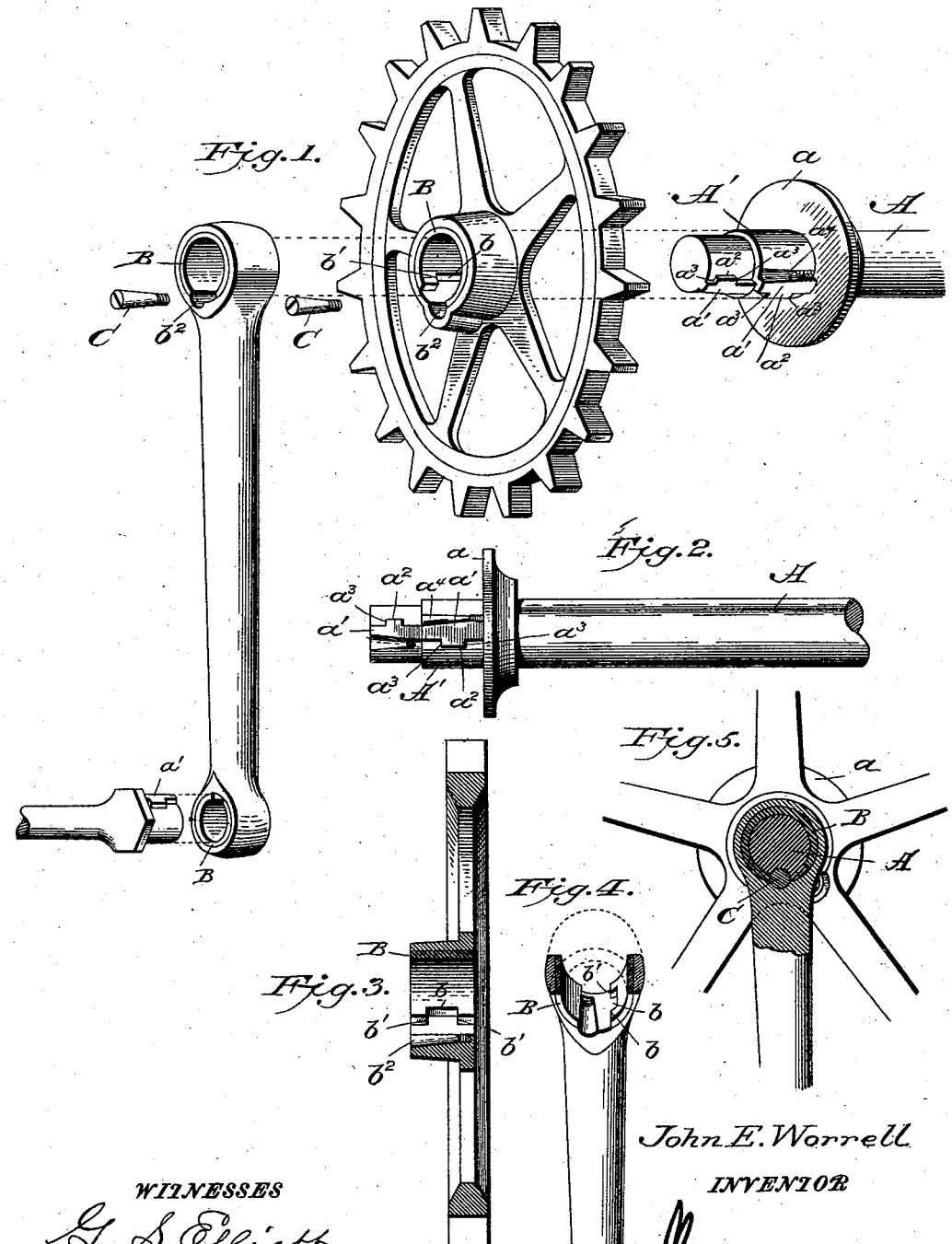

JOHN E. WORRELL, OF JEFFERSONVILLE, INDIANA.

COUPLING FOR SPROCKET-WHEELS.

SPECIFICATION forming part of Letters Patent No. 536,115, dated March 19, 1895.

Application filed December 27, 1894. Serial No. 533,073. (No model.)

*To all whom it may concern:*

Be it known that I, JOHN E. WORRELL, a citizen of the United States of America, residing at Jeffersonville, in the county of Clark and State of Indiana, have invented certain new and useful Improvements in Couplings for Sprocket-Wheels, &c.; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in couplings for connecting sprocket-wheels, &c., to axles, and is designed more particularly for connecting the sprocket-wheel and cranks of a bicycle to the shaft, as well as the pedal-pins to the cranks.

The invention consists in the improved coupling which provides one of the parts with a shouldered projection or feather and adjoining recess and the other part with a shouldered recess to receive the feather and a second recess which with the recess in the first mentioned part forms a seat to receive a tapered and threaded key as a secondary lock for holding the parts in positive engagement with each other, as will be hereinafter fully set forth and particularly pointed out in the claims.

In the accompanying drawings, forming part of this specification, Figure 1 is a perspective view showing the parts of my improved coupling separated, and illustrating its application to the axle, sprocket-wheel, crank and pedal-pin of a bicycle. Fig. 2 is a side elevation of the axle. Figs. 3 and 4 are sectional views of the sprocket-wheel and crank, and Fig. 5 is a sectional view through the coupling.

A designates the axle which is provided with the usual collar $a$ and beyond the collar is a seat $A'$ for the sprocket-wheel, said seat being of slightly greater diameter than the mean diameter of the axle, and beyond the seat the diameter of the axle is reduced as shown. The parts of the axle which receive the sprocket-wheel and cranks have formed thereon or attached thereto in any suitable manner a feather $a'$ which projects beyond the circumference of the seat. This feather is provided on one edge with one or more projections $a^2$ to form shoulders $a^3$, and the opposite edge of the feather is cut away to form a continuation of a tapered recess $a^4$ in the seat, the seat being threaded beyond the smaller end of the recess, as shown. This construction is duplicated on the end of the pedal-pin which is attached to the crank.

The eye in the sprocket-wheel and cranks is made by first boring or turning a round aperture of greater diameter than the seat for the eye, and in the aperture so formed is secured a bushing B the thickness of which is substantially the same as the thickness of the feather $a'$ on the seat. The bushing is provided with a cut away portion on one side of which is a recess $b$ forming shoulders $b'$ which are adapted to fit snugly against the shoulders $a^3$ of the feather. The bushing on the other side of the cut away portion therein is recessed to form a continuation of a conical recess $b^2$ in the hub, the smaller end of said recess being threaded, and this recess in connection with the recess $a^4$ in the axle forms a seat to receive a key C which is tapered and provided with a threaded end as shown. If desired the bushing may be dispensed with by forming the recesses in the hub itself. When the bushing is used it is secured in place either by brazing, soldering or by any of the methods usually employed.

In assembling the parts, for example a sprocket-wheel to its shaft, the sprocket-wheel is placed over its seat so that the feather will enter the recess in the eye after which the parts are turned to cause the projecting portion of the feather to enter the recess $b$ which will prevent lateral movement of the sprocket-wheel as well as key it to the shaft so as to rotate therewith. To complete the coupling the tapered key is placed in the recess therefor and screwed to hold the parts in positive engagement, the key preventing the parts being displaced by a backward thrust.

The cranks are connected to the axle and pedal-pins in the same manner that the sprocket-wheel is attached to the axle or shaft.

It will be particularly noted that the feathers are integral parts of the shaft, and that the bushings are rigidly attached to the eyes, so that in use the only parts that are not rigidly secured are the keys, and a great deal of strain is removed from the keys by the feathers. It will also be noted that the keys engage with the seats, bushings and eyes.

The coupling may be used not only upon bicycles but for connecting pulleys and wheels to shafts.

Having thus described my invention, what I claim as new, and desire to secure by Letters Patent, is—

1. Means for connecting or coupling sprocket-wheels, cranks, &c., to their seats, comprising a member having a seat provided with a feather with a projecting portion on one edge and a recess adjoining the feather, another member adapted to be secured upon the seat of the first member and having recesses forming shoulders which engage with the projection on the feather and a recess which in connection with the recess in the seat forms a complete key-seat, and a locking-key for holding the parts in positive engagement, substantially as shown and for the purpose set forth.

2. The herein described coupling consisting of a member provided with a seat having a feather one edge of which is provided with a central projection or projections and the opposite edge being constructed to form a recess which is partially threaded; another member provided with an eye which interlocks with the seat and is provided with a partially threaded recess which registers with the partially threaded recess in the seat, and a locking-key having threads which engage the threads in the recesses in the seat and eye, substantially as shown and for the purpose set forth.

3. The herein described coupling consisting of a member provided with a seat having a feather one edge of which is provided with a central projection and the opposite edge being constructed to form a recess which is partially threaded; the other part of the coupling provided with an eye, a bushing fitting in the eye which is adapted to interlock with the feather, the bushing and eye having formed therein a recess which is partially threaded, the parts when interlocked being adapted to be held against lateral movement, and a tapered locking-key having threads for engagement with the threads on the feather, bushing and eye, substantially as shown and for the purpose set forth.

In testimony whereof I affix my signature in presence of two witnesses.

JOHN E. WORRELL.

Witnesses:
M. B. WORRELL,
ANNETTE C. WORRELL.